United States Patent [19]
Jones, Jr.

[11] Patent Number: 5,965,201
[45] Date of Patent: Oct. 12, 1999

[54] HARDENED HYDRAULIC CEMENT, CERAMIC OR COARSE CONCRETE AGGREGATE TREATED WITH HIGH PRESSURE FLUIDS

[75] Inventor: Roger H. Jones, Jr., Reno, Nev.

[73] Assignee: Materials Technology Limited, Reno, Nev.

[21] Appl. No.: 08/858,721

[22] Filed: May 19, 1997

Related U.S. Application Data

[60] Provisional application No. 60/019,027, May 20, 1996.
[51] Int. Cl.$^6$ ...................................................... B05D 5/00
[52] U.S. Cl. ......................... 427/243; 427/335; 427/337; 427/352
[58] Field of Search ..................................... 427/243, 335, 427/336, 337, 352

[56] References Cited

U.S. PATENT DOCUMENTS

| | | | |
|---|---|---|---|
| 4,400,413 | 8/1983 | Emmons et al. | 427/136 |
| 5,066,522 | 11/1991 | Cole et al. | 427/422 |
| 5,169,687 | 12/1992 | Sunol | 427/297 |
| 5,518,540 | 5/1996 | Jones, Jr. | 106/638 |
| 5,650,562 | 7/1997 | Jones, Jr. | 73/38 |

*Primary Examiner*—Shrive Beck
*Assistant Examiner*—Paul D. Strain
*Attorney, Agent, or Firm*—Townsend and Townsend and Crew

[57] ABSTRACT

The properties of cement matrices are improved by one or more of the three processes which can be performed individually, sequentially, or in any desired combination. In each instance a supercritical fluid including at least one substance other than $CO_2$ is flowed through the matrix and the matrix is contacted by the substance to change, e.g. react, constituents of the two with each other. Alternatively, the supercritical fluid can be used as a solvent, itself or by combining it with a solvent which itself may or may not be supercritical, and the fluid is infused into the matrix to carry into the matrix and there deposit the dissolved material. This step can be repeated with another supercritical fluid which has a reactant for the material dissolved so that, upon the infusion of the second supercritical fluid, the initially deposited material and the reactant react to provide the matrix with desired characteristics. In a third alternative the supercritical material includes a solvent which itself may or may not be supercritical and which, upon infusion into the matrix passages, dissolves a selected material which can then be flowed out of the matrix.

19 Claims, No Drawings

HARDENED HYDRAULIC CEMENT, CERAMIC OR COARSE CONCRETE AGGREGATE TREATED WITH HIGH PRESSURE FLUIDS

This application claims benefit of Provisional Application No. 60/019027 filed May 20, 1996.

BACKGROUND OF THE INVENTION

Hydraulic cement that has set and completely hardened, as well as hardened or fired pottery or ceramic matrices, are porous, brittle and relatively weak. They crack easily and are difficult to permanently repair. In fact, replacement is generally the best and most frequent alternative.

Two different techniques have in the past been attempted to improve their physical properties. The first is to modify the wet paste prior to hardening or firing by incorporating liquid "modifiers", particulate admixtures or fibrous reinforcement. The second alternative uses chemicals (generally liquids) to surface-coat or to migrate into the hardened matrix material. Similarly, after crack development or breaking, adhesives and fillers which may or may not slightly penetrate into the matrix may be employed for repair, to form bridges between the edges of cracks or to inhibit further crack propagation. Another method, where there is surface spalling, pothole development or the formation of large cracks, fills the damaged areas (either with or without the removal of loose debris) with specialized concrete, cements or mortars. These solutions have not been particularly successful in creating or repairing cementitious materials in ways that either restore them or leave them suitable for high-performance applications where tensile strength, resistance to new or further cracking or breakage, flexibility or ductility are desirable properties.

For purposes of this application, the word "cement", used alone or in combination with other words, refers to any type of cementitious material made with water and one or more inorganic ingredients to form a paste which, through reactive processes, creates hydrogels to bind it together. The definition includes, but is not limited to, ceramics, pottery, clay, mud, earthenware, portland, natural and fly-ash pozzolan, lime, gypsum, cementitious materials and the like.

Problems are also encountered with the sand and/or coarse aggregates (typically of an average size between ⅜" and 3½") in cement matrices to form concrete or mortar. Many sands and coarse aggregates exhibit properties and behaviors similar to those of hardened cement, pottery or unfired or fired ceramic matrices. In addition, certain coarse concrete aggregates, particularly zeolites and dolomites, may react with the hydraulic cement that binds them together in concrete and mortar. Aggregates having high levels of porosity and low strength also cause problems. Thus, many commonly occurring aggregates are banned from use in concrete because of such problems.

Chemistry, morphology, geometry and micro-morphology of hardened man-made matrices and natural aggregate determine how aggressively decomposition reactions proceed, often as a consequence of alkali/silica reactions (ASR). To ameliorate some of these problems, aggregates have been soaked in water, salts, acids or even strong alkalis, but the results have been inconsistent and often disappointing. Thus, when a local aggregate is unacceptable for use in concrete, suitable aggregate must either be imported or man-made, often at considerable expense.

The present invention seeks to alleviate problems of this kind by treating natural or man-made cement and/or aggregates with supercritical fluids to alter their surface, surface layer, and in some cases their entire body chemistry and/or microstructure.

As is well known from the literature, every pure substance has a certain, temperature/pressure threshold, above which, when simultaneously exceeded, all the properties of the substance continuously change without exhibiting any gas/liquid phase discontinuity. These are known as the "critical pressure" and "critical temperature" ($T_c$ and $P_c$) of a pure substance. The combined critical pressure and critical temperature threshold is called the "critical point" of a pure substance. A substance or mixture that has been elevated above the critical point is "supercritical". The term "supercritical fluid" refers to substances, mixtures and solutions which are in this state. Supercritical pure substances, mixtures and solutions exhibit varying degrees of solvent behavior and reactivity with other elements and compounds.

As is disclosed in my U.S. Pat. No. 5,518,540, issued May 21, 1996 (the "'540 patent"), the disclosure of which is incorporated herein by reference, when a hardened, porous cement or ceramic matrix is exposed to supercritical carbon dioxide ("$scCO_2$"), alone, the $scCO_2$ infuses into the matrix and causes chemical and microstructural changes that can produce desirable properties and behavior in the matrix.

SUMMARY OF THE INVENTION

The present invention carries the invention disclosed in the '540 patent further and uses or combines selected supercritical substances, mixtures and solutions, usually gases or liquids, but not necessarily limited thereto, in many instances without but if desired also with $CO_2$, either supercritical or non-supercritical $CO_2$, to improve the hardened hydraulic cement, pottery, ceramic and the like, as well as coarse aggregate matrices, in certain desirable and predeterminable ways.

To achieve this, the present invention employs one or more of three different process paths to enhance the characteristics of the matrix. One is to react the matrix or previously infused materials with a supercritical fluid. The second is to use the supercritical fluid as a solvent to carry materials into the interstices of the matrix and deposit them there and/or cause them to chemically react with compounds forming or previously infused into the matrix to produce predictable, desired changes. The third alternative is to use the supercritical fluid as a solvent to dissolve and extract materials from the matrix, itself, or to extract materials previously infused into or created as reaction products within the matrix. The three alternatives may be used separately, sequentially or simultaneously to modify the hardened material. When used in combination, the order of their use may also be varied. Further, repetitive, sequential exposure may be employed to permit the infusion of selected compounds into or their extraction from the matrix. Table 1 illustrates possible combinations of these processes.

TABLE 1

|  | Reaction | Infusion | Extraction |
| --- | --- | --- | --- |
| Method 1 | XX | | |
| Method 2 | XX | XX | |
| Method 3 | XX | XX | XX |
| Method 4 | XX | | XX |
| Method 5 | | XX | |
| Method 6 | | XX | XX |
| Method 7 | | | XX |

Any or all of the three supercritical process paths described above may be performed in closed reaction vessels and/or under normal atmospheric conditions, typically by using spray nozzles such as those described, for example, in U.S. Pat. Nos. 5,336,869 and 5,482,211. The class of devices discussed therein, and others, and appropriately scaled, are suitable for the delivery of supercritical fluids to be used as reagents, infusion solvents or extraction solvents. The penetration of the supercritical fluid into the hardened matrices is a function of the pressure and duration of the supercritical exposure as well as equilibria established during any reaction and/or infusion processes.

A key feature of the present invention is to infuse into or extract from cement matrices such things as pulverulent plastic or metal suspensions, metallic or organic solutions, water, and organic and/or inorganic molecules, for example, to improve, coat or otherwise alter the properties of the hard "skeletons" of cement, rock or aggregate in a desired manner. This may but need not be combined with a carbonation of the hardened matrix to produce the changes discussed in the '540 patent or outlined by the following reaction stoichiometries listed and other, similar reactions:

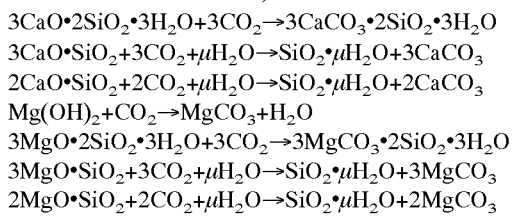

According to this invention, at least one or a combination of solutes other than supercritical $CO_2$, usually selected from those which are gaseous or liquid at ambient room temperature and pressure, is selected. This substance or combination of substances is heated and pressurized to above the critical point for one or more of the substances. Since binary or ternary systems have critical points for each of their constituencies, and since each of the constituencies evokes different solvent properties and degrees of reactivity under supercritical conditions, it is possible to formulate combination substances with unique behaviors relative to the matrix to be treated to give the matrix the desired characteristics.

For example, one constituent of a combination or mixture of substances may have a strong quadruple, like $CO_2$, while another constituent, such as propene ($C_3H_6$), might exhibit a strong dipole moment. This combination is highly polar and exhibits a strong affinity for polar substances. So long as they do not react unfavorably with one another, third or even fourth or fifth substances—there really is no practical limit known at this time—may be included in the combination substance or mixture to change additional properties and/or behaviors of the matrix. Since the properties, molecular dynamics and chemical kinetics of supercritical binary and ternary mixtures and solutions are generally well known and documented in the literature, the appropriate substance or mixture of substances to accomplish the objective of infusion or extraction into or from the matrix can be readily selected.

It is, therefore, an object of this invention to provide a method for improving hardened cement or ceramic matrices, sand, gravel and/or coarse aggregates by treating them with a single or a combination of supercritical fluids that react with them and/or infuse solutes, reagents or suspensions into them and/or extract reaction products, solutes or suspensions from them.

It is also a further purpose of this invention to improve by reaction, infusion and/or extraction, hardened hydraulic cement, ceramic matrices or large aggregates by using supercritical $CO_2$ in combination with other supercritical substances (usually gases or liquids when at room temperatures [ca. 33° C.] and sea-level atmospheric pressures [1 bar], but not limited to such liquids or gases) alone, and/or with additional materials (including, but not limited to, water, conventional solvents and/or reagents), which are either above or below their critical points.

It is another purpose of this invention to improve by reaction, infusion and/or extraction, hardened hydraulic cement, ceramic matrices, large aggregates, and the like by using supercritical substances, other than supercritical $CO_2$, including or not including non-critical (gas-, liquid- or solid-phase) $CO_2$, alone or in combination with additional materials (including, but not limited to, water, conventional solvents and/or reagents), either above or below their supercritical points.

DESCRIPTION OF THE PREFERRED EMBODIMENTS

The process of the present invention can be advantageously employed for producing numerous changes in the micro-morphology and properties of hardened and semi-hardened cementitious or hydraulic cement matrices. For convenience, such hardened and semi-hardened matrices are at times referred to in this application as "Chemically Bonded Ceramics" or "CBC". By using the three process alternatives or pathways (reaction, infusion, extraction) singly, sequentially or in combination, a matrix can be changed either during or, more typically, after the hydrating cement paste or concrete has been changed (e.g. by casting, molding, extruding or pultruding, and the like).

Table 2 lists some representative and for purposes of the present invention relatively more practical substances for use under supercritical conditions, and their relevant properties. Table 2 is merely illustrative and is not a comprehensive or complete list of substances which can be used in the practice of this invention. The substances may be used alone or in combination, depending upon the solvent properties or reactivity with the matrix that is required to achieve a particular result. The critical temperature tie-lines of binary and ternary mixtures is well understood and can usually be calculated (see McHugh, M. A., Krukonis, V. J., "Super Critical Fluid Extraction", 2nd Ed., pp. 29–187, Butterworth-Heineman, 1994).

TABLE 2

| Substance | $T_c$/K | $P_c$/MPa | Dielectric Constant | Dipole Moment |
|---|---|---|---|---|
| Carbon Dioxide ($CO_2$) | 304 | 7.38 | 1.00092 | 0 |
| Methane ($CH_4$) | 191 | 4.60 | 1.00081 | 0 |
| Ethylene ($C_2H_4$) | 282 | 5.04 | 1.00134 | 0 |
| Propane ($C_3H_8$) | 370 | 4.25 | 1.00200 | 0.084 |
| Propene ($C_3H_8$) | 365 | 4.60 | 1.00228 | 0.366 |
| Sulfur Hexafluoride ($SF_6$) | 319 | 3.77 | 1.00200 | 0 |
| Nitrogen ($N_2$) | 126 | 3.39 | 1.000580 | 0 |

As is known from the '540 patent, the treatment of cement matrices with sc$CO_2$ leads to a reaction between $CO_2$ and Ca[OH]$_2$ and promotes the formation of calcite, vaterite, aragonite or other polymorphs of calcium carbonate.

The properties of cement matrices can also be altered in other ways, as is shown by the representative reactions summarized earlier. Supercritical fluids other than $CO_2$, as well as non-supercritical fluids, may also be used as a non-reactive solvent to carry a solute into or to extract a substance from a hardened matrix. When non-supercritical fluid(s) is(are) used, it, including any solute and/or particle suspension therein, is mixed with a supercritical fluid, which frequently will not be $scCO_2$ but may also include $scCO_2$.

Another feature of the invention is that it permits the manufacture of CBC matrices with superior, heretofore unattainable characteristics in an economically and environmentally sound manner by using, to the extent possible and available, waste stream products such as fly ash, bottom ash, electric arc furnace dust, quarry dust, mine tailings, certain filter cakes such as amorphous silica, calcium aluminate slag (produced during the processing and manufacture of tungsten), and similar materials. Such materials are inexpensive. Their consumption in accordance with this invention may save disposal and/or clean-up costs and is environmentally highly beneficial in that it reduces the release of pollutants.

For example, in an exemplary and preferred embodiment, fly ash from coal-fired electrical power plants is used to generate additional CaO in the fly ash and more $CO_2$ flue gas by adding $CaCO_3$ (calcite) to the coal feed. Calcium oxide mixed with pulverized fly ash (for example, pulverized in a liquid nitrogen thermal shock process to reduce the ash particle size) can be used in combination with a 5% $H_3PO_4$ solution to produce a hard new CBC which can be treated with the $CO_2$ of the flu gas as a supercritical fluid in a mixture with another major flu gas component, $N_2$, and/or other gases to give the CBC desired characteristics.

This embodiment of the invention is significant because it uses waste from the generation of electric power to make and treat CBC, for example in the form of blocks, wallboards, railroad ties, etc., as well as many other finished products. In addition, a portion of the electric power can be used to prepare liquid nitrogen, or liquid $NH_3$. The latter, when combined with S as $SO_2$ or $SO_3$, yields fertilizer $(NH_4)_2SO_4$ ammonium sulfate. In the case of low sulfur coal, cool liquid $NH_3$ can be directly injected into the soil to increase crop yield.

Indeed, $CO_2$ from effluent gases does not even have to be dried, so that polar $H_2O$ molecules can be employed to carry high dielectric additives into the CBC matrix. For an average type I cement, for example, the decrease in $CO_2$ emissions from such a process has an environmentally impressive impact because 2000 lbs. of portland CBC will consume about 1000–1100 lbs. of $CO_2$ from the flu gases. The use of "wet" or damp $CO_2$ makes it possible, for example, to carry water soluble acrylic monomers into the CBC to change its color, thereby acting as an internal paint.

In another embodiment, ~3% hydrogen peroxide can be introduced into the fly ash along with CBC initiators (e.g. oxides, hydroxides, phosphoric acid) to produce a very light-weight, usually less darkly colored, foam-like, untreated pozzolanic matrix (which has a much higher silicon content than most portland CBC). After supercritical $CO_2$ ("$scCO_2$") treatment, the hardened CBC matrix can be used as a light-weight cement aggregate additive.

A fluid may also be chosen which has both reagent and solvent properties.

In accordance with another aspect of the invention, infusion is used to transport dissolved materials into and deposit them in the matrix. They may be left in place, adsorbed onto or into the micropore walls of the untreated CBC product, or they may subsequently be reacted or extracted, using supercritical fluids as solvents. This can be used, for example, to increase the porosity of a material by including in the wet cement paste, for example, materials that are readily soluble in supercritical solvents. For such a use, the polymeric materials should typically have relatively low molecular weights (say, under 100,000) and are ideally formed into small beads or strands. After the paste has hardened, the polymeric inclusions in the matrix are dissolved and extracted with a supercritical fluid, thereby leaving voids in the matrix.

Extraction can also be used to remove materials that were earlier infused into the matrix, or which result from reaction processes with a supercritical fluid or chemical solvent.

For optimal process conditions, control and termination, it is important to know or determine the necessary parameters for achieving the desired reaction and/or mass transport in or through porous structures. One preferred way of doing this is experimentally by determining the extent of penetration, reaction, infusion and/or extraction, for example by taking and analyzing a cross-section or core sample of the matrix and examining the cut surfaces under a microscope, or by applying dies to them which can reveal penetration and/or reactions. A close approximation of penetration can also be mathematically determined in advance as is generally discussed in references (1) through (8), for example, in the Listing of References at the end of this application.

In another embodiment, substrate is first deposited in the untreated CBC matrix with $N_2$, $SF_6$ or another non-reactive gas. This is followed by treatment of the matrix with $scCO_2$, which may or may not have further additives.

A yet further embodiment adds certain materials to the CBC matrix when it is initially prepared. As was mentioned earlier, the CBC may be made with fly ash, a 5% $H_3PO_4$ solution and either MgO or CaO (in weight proportions of 60:32:5, respectively).

Wherever possible use should be made of the very exothermic and very rapid $scCO_2$ reaction in portland CBC to form calcite, or in fly ash(es) to form zeolitic type structures. The driving force of the $scCO_2$ in the mixed gas fluid will literally suck the other components (solids, liquids or gases) into the matrix.

A given structure can be exposed to the supercritical fluid in a variety of ways, including in the open air (field conditions) or in pressure vessels designed for this purpose. Nozzle systems for use in field conditions are well known, as was mentioned above.

For example, to surface-treat a concrete roadway, exposure to $scCO_2$ can be achieved with solid $CO_2$ or "dry ice" placed beneath a highway roller (steam roller) of the type used for smoothing roadways. The weight of the roller (i.e. the pressure gradient) atop a concrete roadway surface and the temperature of the roadway together allow reaction between the $CO_2$ fluid (under the roller) and the concrete to produce a thin layer of calcite in the concrete to harden and strengthen it. A feed mechanism is placed directly in front of the roller to distribute crushed dry ice (e.g. less than 1' in size) under the roller. As an alternative, a triple point spray gun can be used for the application of dry ice in crushed form.

It is, therefore, possible to practice the present invention with virtually any combination of supercritical fluids subjecting new or old hardened cement matrices to the fluids, to bind concrete together or to form finished goods of all manner and descriptions. The following are a few examples how the present invention can be employed to produce specific products.

Floor and decorative tiles, for example, may be extruded using cement-based materials. While they harden (hydrate), hydroxides are produced.

The hydrated tiles are "painted" with styrene-butadiene latex and exposed to a supercritical solvent composed, for example, of ethylene. The ethylene dissolves the styrene-butadiene coat and transports it into the hardened matrix. Thereafter, the material is briefly exposed to supercritical carbon dioxide, which closes and seals the matrix to a slight surface depth. Alternatively, a mixture of methane and carbon dioxide can be used for carbonating only a portion of the material while leaving the pH relatively high.

As another example, a sheet of parallel carbon fibers bound together with dried styrene butadiene is placed over a concrete surface and sprayed with supercritical propene. The supercritical solvent dissolves a portion of the latex and drives it into the pores and capillaries of the concrete adjacent to the surface, thereby permanently bonding the carbon-fiber mat to the surface of the concrete. This can be used for the adhesion of metal, glass or plastic mats, woven fabrics, and individual strand materials, and the like to concrete and other CBC surfaces.

The present invention can also be used to harden and strengthen surfaces of cement-based pipe. This can be done with new pipe or, in situ, to existing cement and concrete pipe and pre-casts. Concrete subject to possible damage from water, such as surfaces of dams, concrete pilings, spillways, and the like can also be treated under water to prevent ion diffusion. This is accomplished by passing a supercritical spray nozzle at close range over the surfaces, infusing into them solutes which will close the pores and capillaries of the concrete and, if reaction is necessary, reacting the hydroxides to form carbonates.

Another use of the present invention is for treating batches of large concrete aggregate down to fine grain sand which might react with or otherwise harm the concrete or other CBC structure. This is done in a reaction vessel to assure close control over the chemicals transported into the aggregate and/or adsorbed onto exposed surfaces and within pores and capillaries.

The present invention can also be used, for example, to produce light-weight aggregate by making a paste of granitic quarry fines which are cemented with lime, high-aluminate pozzolan, water and hydrogen peroxide and then rolled or tumbled to close their surfaces. After hydration is complete, the aggregate is subjected to supercritical $CO_2$ combined with $N_2$ to close its surface. In the process, nitrogen atoms react with the CaAlSiO to form SiAlON and $CaCO_3$ compounds. The resulting aggregate has smooth, regular surfaces and extreme hardness, is very light-weight, and has porous cores.

What is claimed is:

1. A method of treating a hardened cement matrix to change a characteristic of the matrix, the method comprising the steps of providing a supercritical fluid free of $CO_2$ which is capable of affecting the matrix, infusing the supercritical fluid into passages of the matrix, and maintaining at least one substance in the matrix for a period of time selected to permit the at least one substance to affect the matrix in the desired number.

2. A method according to claim 1 wherein the at least one substance is a solvent for a desired material, and including dissolving the material in the solvent.

3. A method according to claim 2 wherein the solvent is also the supercritical fluid.

4. A method according to claim 2 wherein the step of dissolving is performed outside the matrix and prior to the infusing step, and including the step of depositing the material on an interior of the matrix.

5. A method according to claim 3 wherein the material is within the matrix, and including the step of dissolving the material in the solvent after the infusing step and inside the matrix.

6. A method according to claim 5 including the step of flowing the supercritical fluid including the dissolved material, out of the matrix.

7. A method according to claim 1 including the steps of placing a first material within the matrix, providing a second material selected to react with the first material, dissolving the second material in a solvent, such that the supercritical fluid comprises the solvent including the dissolved second material, and after the infusing step reacting the second material with the first material inside the matrix.

8. A method according to claim 7 wherein the at least one substance is a supercritical substance.

9. A method for changing a characteristic of an inside of a hardened cement matrix, the method comprising the steps of providing a supercritical fluid free of $CO_2$, dissolving a material in a fluid substance, including the fluid substance in a supercritical fluid to form a mixture, and flowing the mixture through passages of the matrix.

10. A method according to claim 9 wherein the step of dissolving the material is performed inside the matrix, and including the step of flowing the mixture including the dissolved material out of the matrix.

11. A method according to claim 9 wherein the step of dissolving is performed outside the matrix, and including the step of flowing the mixture into the passages of the matrix.

12. A method according to claim 9 including the steps of providing a reactant for the material, placing one of the material and the reactant inside of the matrix, dissolving the other one of the material and reactant in the fluid substance, and including the step of reacting the reactant and the material on the inside of the matrix.

13. A method according to claim 12 wherein the step of placing comprises providing a cement paste including the material, and curing the cement paste into the hardened cement matrix so that the material forms part thereof.

14. A method according to claim 13 wherein the step of placing comprises dissolving the material in a solvent to form a solution, subjecting the solution to supercritical conditions, infusing the solution including the dissolved material under supercritical conditions into the passages of the matrix, and depositing the material from the solution onto the matrix.

15. A method according to claim 14 including the steps of entraining the reactant in the supercritical fluid, and infusing the supercritical fluid including the reactant into the passages so that the material and the reactant react inside the matrix.

16. A method according to claim 9 including the steps of placing the material inside the matrix, providing a solvent for the material, making the solvent part of the supercritical fluid, flowing the supercritical fluid through the passages of the matrix, dissolving the material in the solvent to thereby form voids in the matrix where the material was previously placed, and flowing the solvent including dissolved material therein out of the matrix to thereby form a light-weight matrix.

17. A method according to claim 16 including forming a cement paste and curing the paste into the hardened cement matrix, and wherein the step of placing the material comprises forming a multiplicity of bodies with the material, and incorporating the bodies in the paste prior to the curing step.

18. A method according to claim 17 wherein the bodies comprise fibers.

19. A method according to claim 9 including the step of providing a reactant for the material, and including the steps of placing one of the material and the reactant inside the matrix and entraining the other one in the supercritical fluid, and reacting the material and the reactant inside the matrix.

* * * * *